(12) United States Patent
Vu

(10) Patent No.: US 6,838,782 B2
(45) Date of Patent: Jan. 4, 2005

(54) WIND ENERGY CAPTURING DEVICE FOR MOVING VEHICLES

(76) Inventor: Thomas H. Vu, 12 Blenheim Ct., Arden, NC (US) 28704

( * ) Notice: Subject to any disclaimer, the term of this patent is extended or adjusted under 35 U.S.C. 154(b) by 107 days.

(21) Appl. No.: 10/287,478

(22) Filed: Nov. 5, 2002

(65) Prior Publication Data

US 2004/0084908 A1 May 6, 2004

(51) Int. Cl.$^7$ .............................. F03D 9/00; H02P 9/04
(52) U.S. Cl. ........................................... 290/55; 200/44
(58) Field of Search .............................. 290/44, 55, 54, 290/43; 417/231; 416/119, 17, 55; 415/285, 208; 180/2.2, 2.3, 16.5, 65.2, 65.3

(56) References Cited

U.S. PATENT DOCUMENTS

| | | | |
|---|---|---|---|
| 3,876,925 A | | 4/1975 | Stoeckert ........................ 322/1 |
| 4,075,545 A | * | 2/1978 | Haberer ......................... 322/35 |
| 4,168,759 A | | 9/1979 | Hull et al. .................... 180/2.2 |
| 4,179,007 A | * | 12/1979 | Howe ........................... 180/2.2 |
| 4,237,384 A | * | 12/1980 | Kennon ........................ 290/55 |
| 4,254,843 A | * | 3/1981 | Han et al. .................... 180/165 |
| 4,314,160 A | * | 2/1982 | Boodman et al. ............. 290/55 |
| 4,423,368 A | * | 12/1983 | Bussiere ....................... 322/35 |
| 4,424,452 A | * | 1/1984 | Francis ......................... 290/55 |
| 4,753,078 A | * | 6/1988 | Gardner, Jr. ................. 60/668 |
| 5,280,827 A | * | 1/1994 | Taylor et al. ............... 180/165 |
| 5,287,004 A | * | 2/1994 | Finley .......................... 290/55 |
| D374,656 S | | 10/1996 | Richardson ............... D13/1.15 |
| 5,680,032 A | * | 10/1997 | Pena ........................... 290/52 |
| 5,746,283 A | | 5/1998 | Brighton .................... 180/65.2 |
| 5,986,429 A | | 11/1999 | Mula, Jr. .................... 320/101 |
| 6,138,781 A | | 10/2000 | Hakala ........................ 180/2.2 |
| 6,373,145 B1 | * | 4/2002 | Hamrick ...................... 290/44 |

* cited by examiner

*Primary Examiner*—Nicholas Ponomarenko
*Assistant Examiner*—Julio C. Gonzalez R.
(74) *Attorney, Agent, or Firm*—Richard C. Litman

(57) ABSTRACT

A wind energy capturing device for moving vehicles including a wind turbine powered electrical power generator for installation on the roof of a moving vehicle such as a truck cab or tractor. The invention takes advantage of the powerful wind force generated by the vehicle moving on the road at moderate to high speed impinging against the wind deflector mounted on the truck cab or tractor. This otherwise "wasted" wind energy is captured and directed to the face area of the rotor blade, rotating the turbine, which, in turn, drives the generator to generate electricity. The electrical energy may be stored in a battery system and used to drive the motors of an electric vehicle or hybrid-electric vehicle.

6 Claims, 3 Drawing Sheets

WIND ENERGY CAPTURING DEVICE FOR MOVING VEHICLES

BACKGROUND OF THE INVENTION

1. Field of the Invention

The present invention relates to electric power generation for vehicles. More particularly, the present invention relates to wind turbines mounted on moving vehicles for converting the wind energy into electricity for storage in a battery system or use by the vehicle.

2. Description of the Related Art

Wind turbines are typically mounted on wind towers in areas known to have high wind velocity. Various configurations of wind turbines are designed to convert wind energy into electrical power for use in homes and industries.

The greatest challenge with wind turbines as a reliable source of energy is that they depend on the quantity and quality of the wind. Depending on the design, wind speed must maintain a certain minimum velocity to overcome friction of moving parts. Even in the best geographical areas, average wind speed is only in the range of 18 to 47 kph. To justify the projects, and generate adequate return on investment, the sizes of wind turbines are usually very large, with rotor diameter in the range of 40 to 50 meters. Typical rotor speed is between 20 and 50 rpm, which must be increased, through a gearbox, to between 1,000 and 1,500 rpm, which is required for most types of electric generators.

Despite the above challenges, interest remains very high around the world to harvest this clean, free, and inexhaustible energy source, i.e., wind power.

Transportation vehicles such as automobiles, trucks, and trains are usually moving at moderate to high speed on an open road. This movement generates an approximately opposite and equal head wind speed relative to the vehicle. This wind causes "wind drag," and is usually detrimental to the overall efficiency of the vehicle.

Due to air pollution and noise concerns, electric and/or hybrid electric vehicles are gaining popularity in states such as California and New York, as well as in Europe and Japan.

The advantages of electric vehicles include low cost per kilometer of driving distance, no "engine" noise, and recovery of energy (battery system is recharged) through regenerative braking. The greatest challenges for such electric vehicles include the fact that the battery system must be recharged when battery system power is exhausted, and the driving range is limited, due to limited storage capacity in its battery system. Battery system power is spent very quickly when the vehicle is moving predominately forward, without slowing or braking to allow for recharge of the battery system through regenerative braking.

In hybrid electric vehicles, the vehicle range is extended by adding a small gasoline or diesel engine. The engine is used mainly as a backup power source to recharge the battery system when the charge is low, or when the vehicle needs a power boost to climb a long hill, or pass another vehicle. The advantages of this system include low pollutant emissions, low cost per kilometer of driving distance, low noise, the recovery of energy through regenerative braking, and unlimited range from a charging station as long as the vehicle is refueled with gas or diesel fuel.

In today's vehicles, including electric, hybrid electric, and convention fossil fuel-powered vehicles, the faster the vehicle is moving, the more wind resistance it has to overcome. The prevailing wind force is therefore detrimental to the efficiency of the moving vehicles.

There is a need to harness and convert the energy lost to detrimental wind drag into a beneficial source of energy. There is also a need to provide an apparatus such as a wind turbine mounted on the moving vehicle to capture this otherwise wasted energy and convert it into a useful source of energy.

U.S. Design Pat. No. 374,656, issued Oct. 15, 1996, to Richardson, illustrates a car top wind generator.

U.S. Pat. No. 3,876,925, issued Apr. 8, 1975, to Stoeckert, describes a wind turbine affixed to the roof of an electric car and designed such that the force of prevalent air currents is converted into electricity from any direction, whether the car is in motion or not.

U.S. Pat. No. 4,168,759, issued Sep. 25, 1989, to Hull, deceased, et al., and U.S. Pat. No. 5,746,283, issued May 5, 1998, to Brighton, each describe contouring of the rooftop wind turbine housing to insure smooth airflow over the electric vehicle.

U.S. Pat. No. 5,986,429, issued Nov. 16, 1999, to Mula, Jr., and U.S. Pat. No. 6,138,781, issued Oct. 31, 2000, to Hakala, describe wind-powered systems for vehicles which are positioned longitudinally along the frame structure of the electric vehicle, thus, minimizing the drag effect associated with the wind tunnel.

None of the above inventions and patents, taken either singularly or in combination, is seen to describe the instant invention as claimed. Thus, a wind energy capturing device for moving vehicles solving the aforementioned problems is desired.

SUMMARY OF THE INVENTION

The present invention is a wind energy-capturing device for moving vehicles having a wind turbine mounted on the roof of the moving vehicle in an area exposed to the wind force generate by the moving vehicle. The rotating output shaft of the wind turbine is connected to an electric generator, either directly or by belt and pulley or other system. The wind turbine, generator, and any storage battery system are preferably mounted on the roof of the tractor of a trailer and underneath and to the rear of a modified wind deflector similar to those already in use on truck tractor roofs to reduce drag from the front of the trailer exposed above the tractor roof. The generator and battery system can be mounted at locations other than the roof of the tractor. The truck may be hybrid-electric vehicle driven by at least one electric motor in combination with a battery system and a gasoline or diesel engine.

The wind turbine has a forward directed deflector which penetrates the air flow over the air deflector, preferably at the rear of the air deflector, thus allowing high speed air into the wind turbine for generation of electricity. The electrical power may be stored in a battery system for later use, used to drive vehicle systems, or be used in an electric or hybrid electric and fuel burning engine truck tractor. The air fed to the wind turbine may also be moved from a deflector opening in a conventional wind deflector and directed by a duct to the wind turbine.

Accordingly, it is a principal object of the invention to capture energy from wind developed passing over a moving vehicle.

It is another object of the invention to provide a wind turbine which diverts air from the slip stream of high velocity wind diverted over the vehicle and employs the energy captured to drive an electric generator.

It is a further object of the invention to utilize or store the electric power resulting from the electric generator as above.

Still another object of the invention is to partially or fully drive the moving vehicle with the electric power stored as above.

Yet another object of the invention is to capture the slip stream from the rear of a wind diverter on the top of the cab of a truck by a diverter placed to divert high velocity air into the entrance of the wind turbine.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a wind turbine powered electrical power generator for installation on the roof of a moving vehicle such as a truck cab or tractor. The invention takes advantage of the powerful wind force generated by the vehicle moving on the road at moderate to high speed impinging against the wind deflector mounted on the truck cab or tractor. This otherwise "wasted" wind energy is captured and directed to the face area of a rotor blade, rotating a turbine, which, in turn, drives a generator to generate electricity. The truck may be hybrid-electric vehicle driven by at least one electric motor in combination with a battery system and a gasoline or diesel engine.

To generate the same amount of energy, the rotor-blade diameter of the wind turbine of the present invention can be of much smaller size, due to the prevailing high wind velocity, and fairly constant wind speed developed in the slip stream of a moving vehicle as compared to convention stationary wind turbines which must depend on naturally low and variable wind force to rotate its turbine.

To turn the drag force caused by the air against the moving vehicle frontal area into productive electrical energy provides a source of energy useful in various ways in place of energy that normally would have to come from the engine or other sources.

Taking further advantage of the aerodynamic shape of today's vehicles, the proposed wind turbine can be mounted in various areas with optimal wind speed, while presenting the least wind resistance.

Taking further advantage of the aerodynamic shape of a wind deflector commonly used on a truck cab, the wind turbine of the present invention can be mounted so as to divert optimal wind speed while presenting the least wind resistance.

Figure 1:
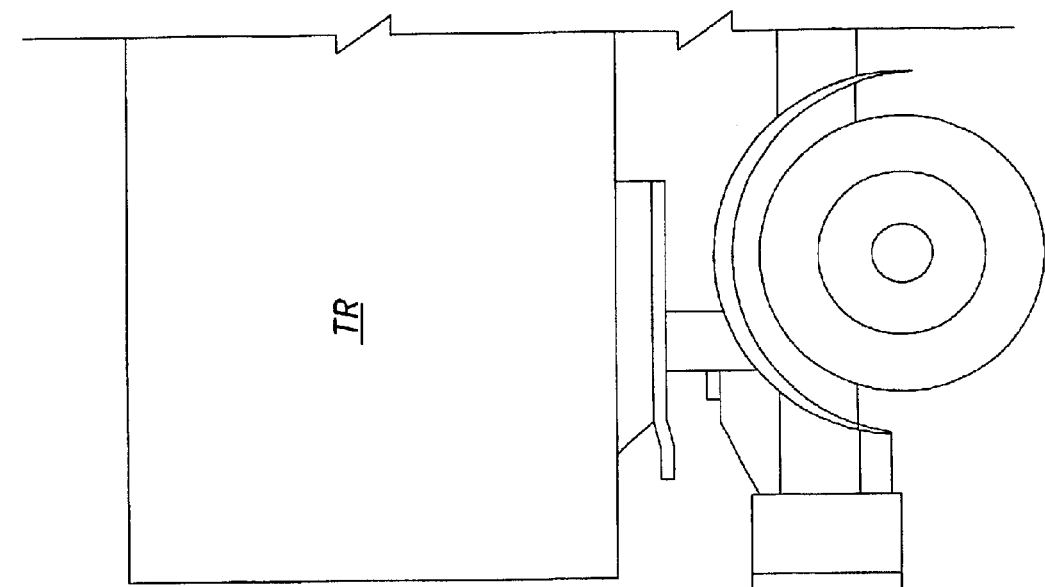
FIG. 1 is an environmental, side elevational view of a wind energy capturing device for moving vehicles according to the present invention as installed on the roof of a truck tractor.
Figure 1:
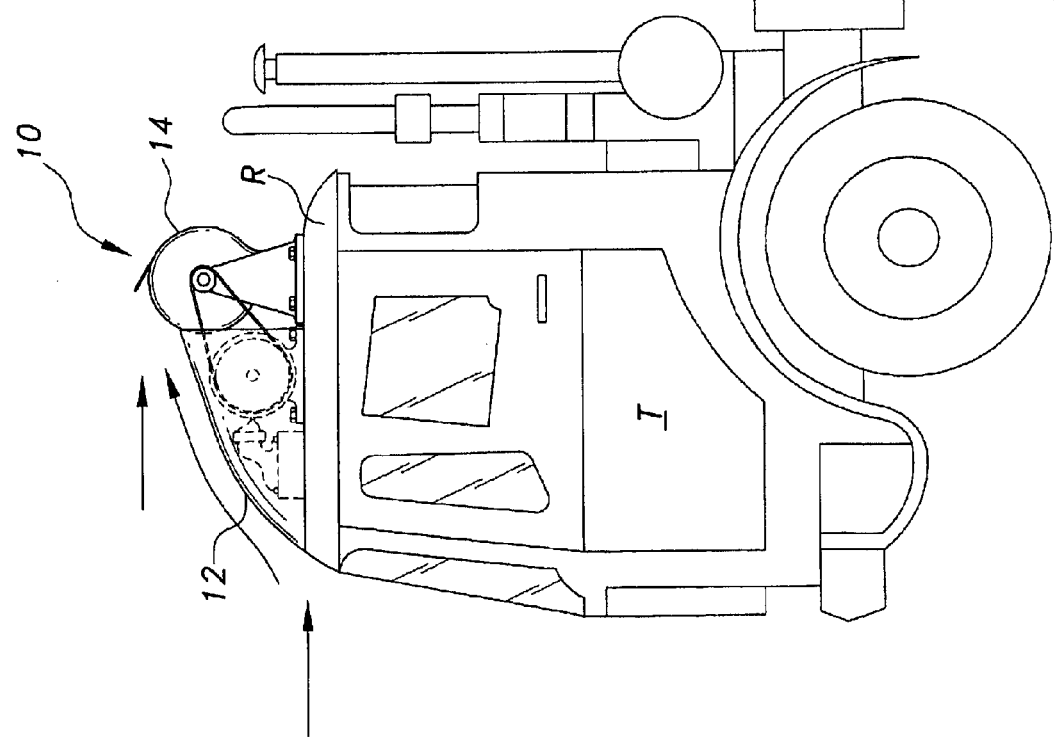
Figure 2:
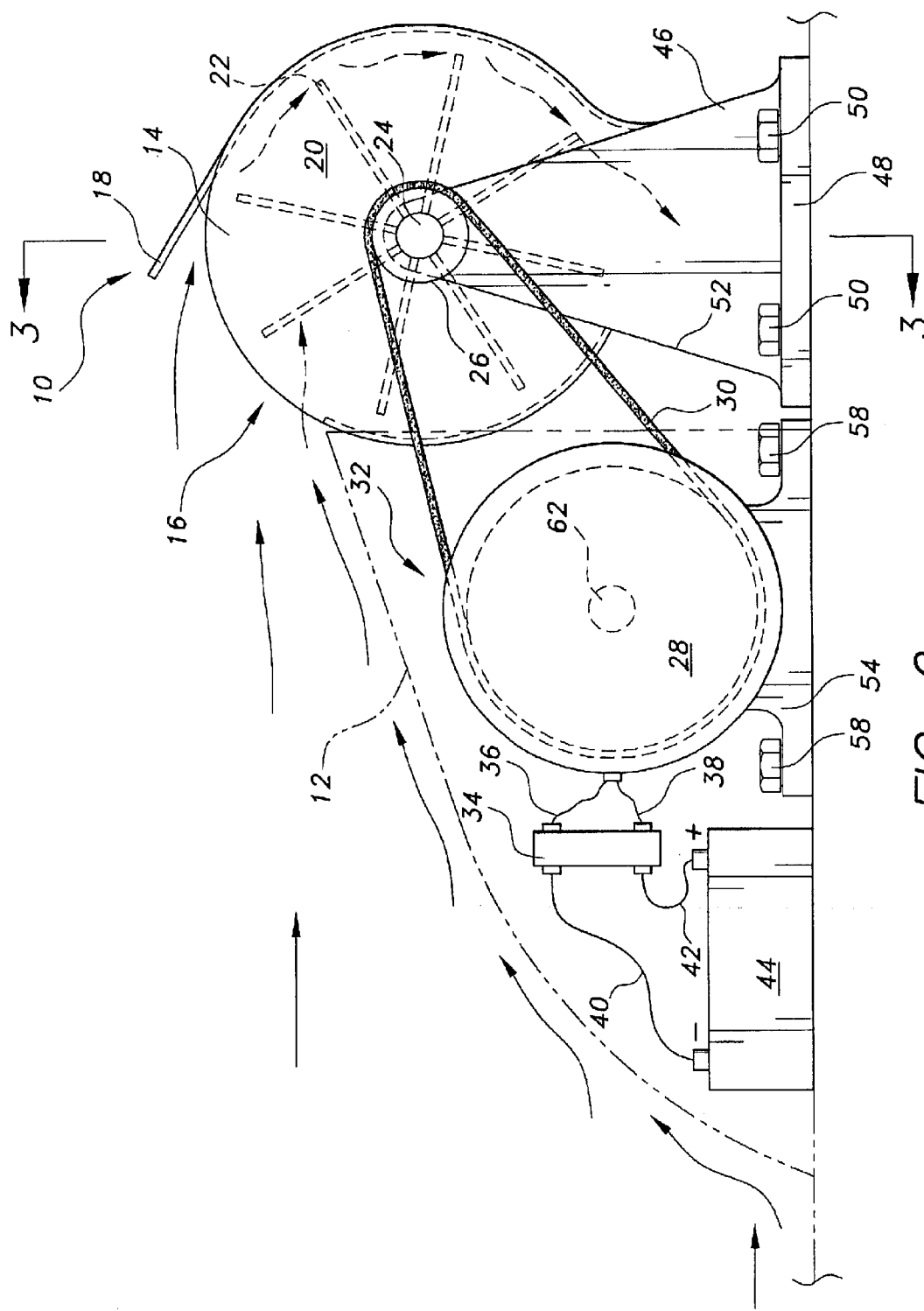
FIG. 2 is a detail view of the turbine system of FIG. 1.
Figure 3:
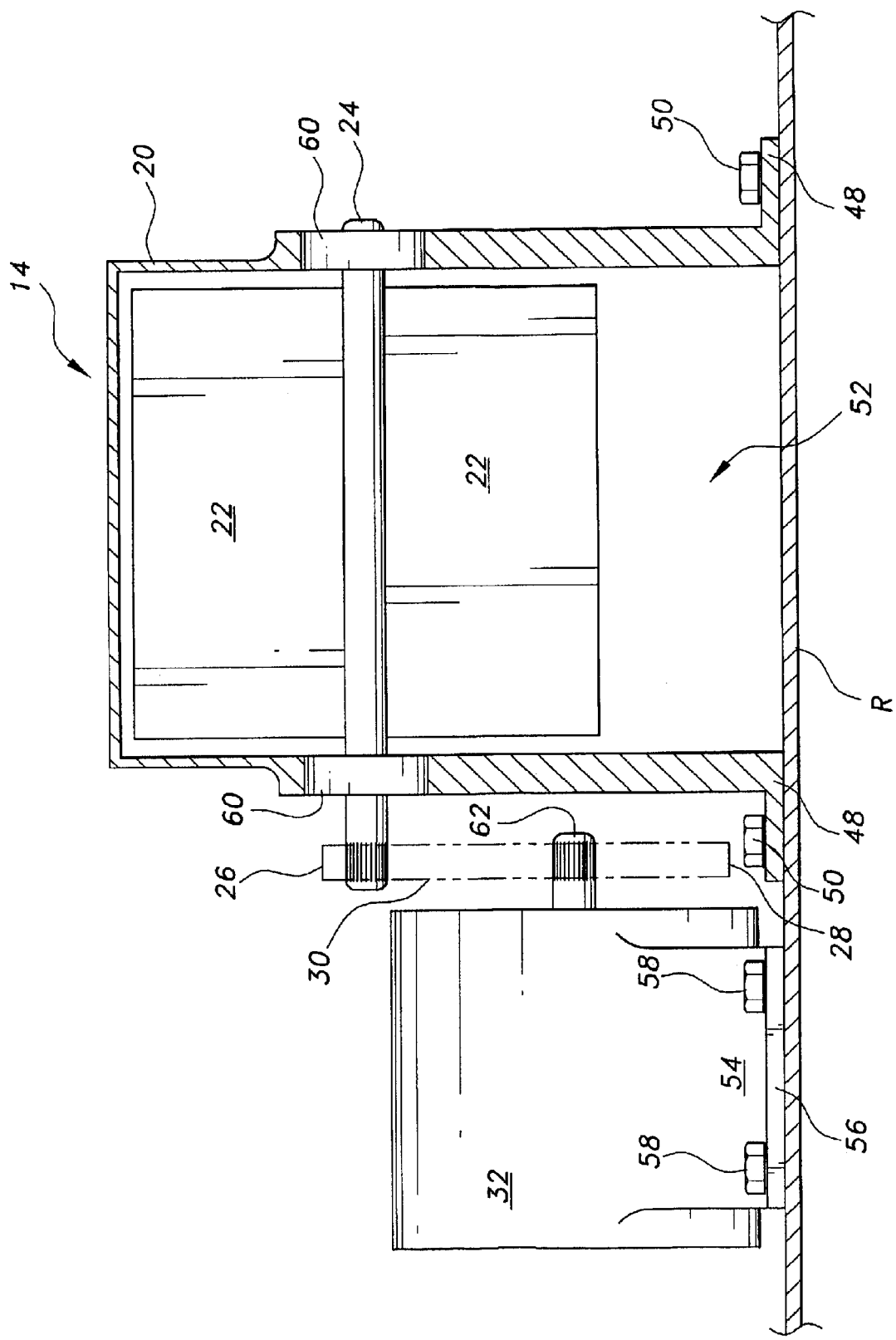
FIG. 3 is a sectional view of the turbine system of FIG. 1 taken along the line 3—3 of FIG. 2.

Referring to FIGS. 1–3, there is shown an environmental, side elevation view, a detail view, and a sectional view of the present invention wherein wind energy capturing system 10 is mounted on the roof R of truck tractor T, pulling trailer TR.

As seen in FIG. 2, wind deflector 12 deflects wind up and back, forming a slipstream where a portion of the wind in this slipstream is directed into turbine inlet 16 by turbine wind deflector 18. Wind turbine 14 has a housing 20 through which the deflected wind impinges on turbine blades 22, which in turn, rotate turbine shaft 24 and turbine pulley 26 mounted on the end thereof. Exhaust wind is allowed to escape at discharge opening 52.

Generator pulley 28 is driven by drive belt 30 as turbine pulley 26 rotates. Generator 32 produces electrical power which is carried to AC/DC converter 34 by converter leads 36 and 38. DC power is supplied from converter 34 to storage battery system 44 by means of battery system leads 40 and 42, thus charging the battery system 44 for later use. The electrical power from generator 30 or battery system 44 may also be directed for use to run accessories or to power an electric or hybrid electric power system (not shown) for the truck tractor T.

The turbine shaft 24 is rotatably mounted on a bearings 60 at each end thereof. Bearings 60 and turbine housing 20 are supported by turbine support 46 having a base 48 fastened to the tractor cab top T by fasteners 50 such as bolts. Generator 32 includes generator support 54 having support base 56 fastened to tractor cab top T by generator support base fasteners 58. As seen in FIG. 3, generator 32 has an input pulley shaft 62 to which generator pulley 28 is secured for rotation.

The diverted wind from other commonly used truck wind diverter designs may be carried through a duct opening (not shown) along the frontal portion and carrying the wind to the wind turbine 14 for conversion and storage of electric power in a manner similar to that described above. The wind turbine may be connected with the electric generator by other equivalent structure such as by a gear train or chain drive. The wind turbine and electric generator may also be designed as a single unit.

The electric generator and/or battery stem can be mounted at any convenient location on the truck tractor.

The electric generator and/or battery system of the invention can be the same as, or a replacement for, the previously existing electric generator and/or battery system of the truck power or electrical system.

It is to be understood that the present invention is not limited to the embodiment described above, but encompasses any and all embodiments within the scope of the following claims.

I claim:

1. A wind energy capturing system for moving trucks having a roofed cab comprising:

a truck wind deflector mounted on the roof of said truck cab at a point forward of said wind turbine, said truck wind deflector being configured to deflect wind in a slip stream upward and over said truck cab;

a wind turbine having a plurality of blades, said wind turbine being mounted to said truck cab roof;

said wind turbine having an inlet located in the slip stream of said wind deflector for receiving wind deflected by said wind deflector at maximum velocity;

said inlet including a turbine wind deflector projecting into the slip stream so as to deflect the maximum velocity wind into said turbine;

said turbine wind deflector being located above and immediately behind said truck wind deflector so as to receive maximum velocity wind from said truck wind deflector; and an electric generator mounted on said truck and connected with said wind turbine so as to generate electricity upon the turning of said wind turbine;

whereby, upon forward movement of said truck, wind deflected by said deflector enters said wind turbine inlet and turns said wind turbine, generating electric power by said generator for storage or use to operate accessories on said truck.

2. The system of claim 1, further comprising a converter electrically connected with said generator so as to generate desired electrical current.

3. The system of claim 2, further comprising a battery system having at least one battery electrically connected with said converter for storing generated electric power.

4. The system of claim 3, wherein said truck is electrically driven in part by the electric power stored in said battery system as generated by said generator.

5. The system of claim 1, wherein each said wind turbine and said generator have rotating shafts, each shaft having a pulley located thereon, and a belt connected therebetween for turning said generator shaft upon rotation of said wind turbine shaft; whereby upon rotation of said wind turbine, electric power is generated by said generator.

6. The system of claim 5, wherein said wind turbine and said generator are located substantially beneath said truck wind deflector.

* * * * *